United States Patent [19]

Suzuki et al.

[11] Patent Number: 5,409,751
[45] Date of Patent: Apr. 25, 1995

[54] DEGRADABLE CONTAINER

[75] Inventors: Kazuhiko Suzuki; Takayuki Watanabe; Yasuhiro Kitahara; Masanobu Ajioka, all of Kanagawa, Japan

[73] Assignee: Mitsui Toatsu Chemicals, Incorporated, Tokyo, Japan

[21] Appl. No.: 32,284

[22] Filed: Mar. 17, 1993

[30] Foreign Application Priority Data

Mar. 27, 1992 [JP] Japan ............................ 4-070868

[51] Int. Cl.$^6$ .............................................. B65D 1/00
[52] U.S. Cl. ................................ 428/36.9; 428/36.92; 215/1 C; 264/531; 264/532; 264/523; 264/537; 264/331.21
[58] Field of Search .................. 428/35.7, 36.92, 36.9; 528/361; 215/1 C; 264/523, 531, 532, 537, 331.12, 331.21

[56] References Cited

U.S. PATENT DOCUMENTS

| | | | |
|---|---|---|---|
| 3,797,499 | 3/1974 | Schneider | 128/334 |
| 5,180,765 | 1/1993 | Sinclair | 524/306 |
| 5,191,037 | 3/1993 | Doi et al. | 525/450 |
| 5,206,341 | 4/1993 | Ibay et al. | 528/361 |

FOREIGN PATENT DOCUMENTS 321176 6/1989 European Pat. Off. .
WO92/04413 3/1992 WIPO .

*Primary Examiner*—Ellis P. Robinson
*Assistant Examiner*—Michael A. Williamson
*Attorney, Agent, or Firm*—Burns, Doane, Swecker & Mathis

[57] ABSTRACT

A degradable container which is excellent in transparency and impact strength and can be decomposed into nontoxic water and carbon dioxide in the natural environment within a relatively short period can be obtained by using the process for molding a container of an arbitrary shape from a thermoplastic composition having polylactic acid of lactic acids or a copolymer of lactic acids and other hydroxycarboxylic acids as a main component, preforming the composition and thereafter molding the container in a temperature range from Tg to Tg+60° C. on the basis of the glass transition temperature Tg of the thermoplastic polymer composition and under the condition of a draw ratio of 6 times or less.

8 Claims, No Drawings

DEGRADABLE CONTAINER

BACKGROUND OF THE INVENTION AND RELATED ART

1. Field of the Invention

The present invention relates to a degradable container, and particularly relates to the container which comprises a thermoplastic polymer composition, has degradability in the natural environment, and is excellent in transparency and impact strength.

2. Related Art of the Invention

Plastic containers have been conventionally prepared from polyethylene, polyethylene terephthalate, polyvinyl chloride, polypropylene and other resins.

Although some of these containers prepared from these resins are excellent in transparency, these containers have a very slow rate of degradation and thus remain semipermanently when discarded as refuse and buried under the ground. Disposal of these containers in the ocean causes aesthtic damage or destruction of the living environment of marine organisms.

Containers of a polyhydroxy butyrate/polyhydroxy valerate copolymer have also been developed, and these are effective for degradability. However, these containers are insufficient in transparency and have a disadvantage that the contents cannot be identified.

On the other hand, polylactic acids and copolymers of lactic acid and other hydroxycarboxylic acids (generic name of the polylactic acid and the copolymer will hereinafter be referred to simply as a lactic acid based polymer) have been developed as thermoplastic polymers having degradability. These polymers can be completely biodegraded within a few months to an year in an animal body. When the polymers are placed in soil or sea water, they start to decompose within a few weeks in a moist environment and disappear within several years. Further, final degradation products of these polymers are lactic acid, carbon dioxide and water which are nontoxic to humans.

No prior art on manufacturing a transparent container with the lactic acid base polymer is known.

That is, on processing the lactic acid based polymer by known molding methods such as compression molding, and injection molding the polymer cannot provide containers having sufficient impact strength for practical use as transparent containers and causes the problem of impaired transparency when improved impact strength is sought. Consequently, containers having both transparency and impact strength which is satisfactory for practical use have not yet been obtained.

SUMMARY OF THE INVENTION

An object of the invention is to provide a degradable container which can be degraded in the natural environment and has transparency and satisfactory impact strength for practical use.

That is, the present invention relates to a degradable container obtained by the process for molding a container of an arbitrary shape from a thermoplastic polymer composition having polylactic acid based polymer as a main component, the process comprising preforming said composition and thereafter molding the container in a temperature range of from Tg to Tg+60° C. on the basis of the glass transition temperature Tg of the above polymer composition and under the condition of a draw ratio of 6 times or less.

The present inventors have found that the container thus obtained has light transmittance of 85% or more, impact strength of 10 times or more as compared with conventional containers and no adverse effect on the degradation property. Thus, the present invention has been completed.

DETAILED DESCRIPTION OF PREFERRED EMBODIMENTS

The present invention relates to a degradable container obtained by the process for molding a container of an arbitrary shape from a thermoplastic polymer composition having a lactic acid based polymer as a main component, the process comprising preforming said composition and thereafter molding the container in a temperature range of from Tg to Tg+60° C. on the basis of the glass transition temperature Tg of the thermoplastic polymer composition and under the condition of a draw ratio of 6 times or less.

The lactic acid based polymer used for the invention is polylactic acid or a copolymer of lactic acids and hydroxycarboxylic acids other than lactic acids. The lactic acids used for a raw material of the polylactic acid or the copolymer of the present invention is L-lactic acid, D-lactic acid, a mixture thereof or lactide which is a cyclic dimer of the above L-lactic acid, D-lactic acid or a mixture thereof.

Hydroxycarboxylic acids other than the lactic acids include glycolic acid, 3-hydroxybutyric acid, 4-hydroxybutyric acid, 4-hydroxyvaleric acid, 5-hydroxyvaleric acid, 6-hydroxycaproic acid and a cyclic intermediate of a hydroxycarboxylic acid such as glycolide which is a dimer of glycolic acid and ε-caprolactone which is a cyclic ester of 6-hydroxy caproic acid.

The lactic acid based polymer can be directly prepared by dehydration polycondensation of the lactic acids or dehydration copolycondensation of the lactic acid and the above hydroxycarboxylic acids or can be prepared by ring opening polymerization of lactide or a cyclic ester intermediate of hydroxycarboxylic acid, for example, glycoide and ε-caprolactone. Any of these compounds can be used in the invention.

When the polymers are directly prepared by dehydration polycondensation, the lactic acids or the lactic acids and other hydroxycarboxylic acids raw materials are subjected to azeotropic dehydration condensation in the presence of an organic solvent, a phenyl ether base solvent in particular. A high molecular weight polylactic acid based polymer obtained by the method in which water is removed from the azeotropically distilled solvent and the resulting substantially anhydrous solvent is returned to the reaction system is particularly suitable for the preparation of degradable containers of the invention.

The molecular weight of the lactic acid based polymer is 10,000 or more. Polymers having high molecular weight can be used so long as polymers can be molded. Polymers having a molecular weight of less than 10,000 provide containers having low-mechanical strength and are unsuitable for practical use. Polymers having a molecular weight of 1,000,000 or more can also be used for preparing the degradable container of the invention by designing the processing method.

A thermoplastic polymer composition is prepared by usually blending the lactic acid based polymer with a known plasticizer and other various additives. The proportion of the lactic acid based polymer in the thermoplastic polymer composition can be determined on the basis of the desired degradability. A proportion of 50% or more is generally preferred. The thermoplastic polymer composition can be prepared by kneading techniques. The composition thus obtained can be in the from of pellet, strand or powder.

Next, the process for preparing the degradable container by using the thermoplastic polymer composition of the invention will be illustrated in detail hereinafter.

In the preparation of the container, the composition is previously formed into a shape which is preferred for molding the degradable container desired, which is referred to as preforming. The shape can be a sheet, hollow body or a form close to the container desired. The preformed composition is shaped to such extent that the desired container can be obtained in the next drawing step. The desired preformed composition can be obtained with ease by known processing methods such as injection molding, extrusion forming and compression molding. For example, injection molding can be carried out at an injection temperature, that is, a cylinder temperature of 180°–300° C., preferably 190°–250° C., and mold temperature of 10°–50° C., preferably 20°–40° C. to obtain the preformed composition. Conditions are about the same as above when other molding methods are used.

The preformed composition is then molded in a temperature range of from Tg to Tg+60° C. on the basis of the glass transition temperature Tg of the thermoplastic polymer composition and under a draw ratio of 6 times or less. When the above composition does not include plasticizer or other additives, the preformed composition is molded in a temperature range of from Tg to Tg+60° C. on the basis of the glass transition temperature Tg of the polylactic acid or the copolymer of lactic acid and other hydroxycarboxylic acids.

Glass transition temperature Tg can be measured with ease by a known method. Polylactic acid has a glass transition temperature Tg of 58°–64° C. Variation is observed in the glass transition temperature of a copolymer of lactic acids and other hydroxycarboxylic acids or of a lactic acid based polymer containing plasticizer and additives. The glass transition temperature is in the range of 20°–65° C. Consequently, the molding temperature range is preferably 20°–125° C. When the molding temperature exceeds 125° C., the molded product has impaired transparency. On the other hand, molding cannot be carried out at less than 20° C. The draw ratio is 6 times or less, preferably 2–4 times and the molded product is monoaxially or biaxially oriented. When the draw ratio exceeds 6 times, precision in thickness of the desired container becomes poor and unfavorable for practical use. Any molding method can be applied so long as the above conditions are satisfied. Injection drawn blow molding and extrusion drawn molding can also be applied. Preferred molding method is drawn blow molding where a preform is heated to 20°–125° C., preferably 60°–90° C. and the air is blown into the preform to form a container.

Direct blow molding is outside of the scope of the invention and molding is carried out without preforming. The lactic acid based polymer has low tension in a molten state and is hence difficult to process by direct blow molding. The container obtained by direct injection molding of the lactic acid based polymer leads to a problem that the container is unsuitable for practical use because of low impact strength, though excellent in transparency.

The term "preforming" in the above molding process means that a sheet, hollow article or a shape close to the desired container is previously formed with a molding machine and thereafter the final product is molded by another molding machine. Additionally, a method for preparing a preform and successively molding the final product without removing the preform from the production line is also included in the scope of the invention.

The above molding process of the invention has been accomplished by finding out the fact that the lactic acid based polymer can be drawn blow-formed at relatively low temperature. The container prepared by the process of the invention is excellent in the transparency and additionally characterized in that a dominant falling impact strength can be obtained as an effect of low temperature drawing.

A suitable machine for injection drawn blow molding is, for example, ASB-50 and ASB-250 (Trade Mark of Nissei ASB Machine Co.). A suitable machine for extrusion drawn blow molding is, for example, BMO-2 (Trade Mark of Bekum Maschinen Fabriken GmbH.).

Molding conditions in order to provide excellent transparency and impact strength for the container prepared by drawn blow molding of the lactic acid based polymer in the invention are suitably determined by the type of molding machine and the kind of the lactic acid based polymer which are used for the molding.

Typical examples are illustrated below.

| Injection drawn blow molding | |
|---|---|
| Preforming: | |
| Injection temperature | 190~250° C. |
| Mold temperature | 20~40° C. |
| Molding cycle | 55 sec |
| Molding: | |
| Blow molding temperature | 50~80° C. |
| Biaxial draw ratio | |
| longitudinal | 1.2~3.5 times |
| transverse | 1.2~6.0 times |
| Blow air pressure | 4~20 Kg/cm$^2$ |
| Extrusion drawn blow molding | |
| Preforming: Extrusion temperature | 190~250° C. |
| Molding: | |
| Blow molding temperature | 50~80° C. |
| Biaxial draw ratio | |
| longitudinal | 1.2~3.5 times |
| transverse | 1.2~6.0 times |
| Blow air pressure | 4~20 Kg/cm$^2$ |

EXAMPLES

The present invention will hereinafter be illustrated in detail by way of examples and comparative examples.

Preparation Example 1

In a 100 L reaction vessel equipped with a Dean-Stark trap, 10.0 kg of 90% L-lactic acid was heated with stirring for 3 hours at 150° C./50 mmHg while distilling off water. And then, 6.2 g of tin powder was added and the reaction mixture was further stirred for 2 hours at 150° C./30 mmHg to obtain an oligomer. To the oligomer, 28.8 g tin powder and 21.1 kg of diphenyl ether were added and an azeotropic dehydration reaction was carried out at 150° C./30 mmHg. Water and the solvent which were distilled out were separated in a water separator and the solvent alone was returned to the reaction vessel. After reacting for 2 hours, the returning solvent was changed to pass through a column packed with 4.6 kg of molecular sieve 3A in order to dry the solvent prior to entering into the reactor, and the reaction was further carried out for 40 hours at 150° C./30 mmHg to obtain a solution of polylactic acid having an average molecular weight of 110,000.

To the solution, 44 kg of dehydrated diphenyl ether was added and cooled to 40° C. Precipitated crystals were filtered, washed 3 times with 10 kg of n-hexane and dried at 60° C./50 mmHg. To the crystals obtained, 12 kg of 0.5N hydrochloric acid and 12.0 kg of ethanol were added, stirred for an hour at 35° C. and filtered. Precipitated powder was filtered and dried at 60° C./50 mmHg to obtain 6.1 kg (85% yield) of polylactic acid powder. The polymer had an average molecular weight of 110,000 and Tg of 59° C.

Pellets of L-lactic acid polymer was prepared by melting the powder in an extruder.

Preparation Example 2

Hereinafter, unit of weight is weight parts.

The same procedures as described in Preparation Example 1 were carried out except that 10.0 kg of L-lactic acid were replaced by 100 parts of DL-lactic acid. The pellets of DL-lactic acid polymer thus obtained had an average molecular weight of 100,000 and Tg of 51° C.

Preparation Example 3

The same procedures as described in Preparation Example 1 were carried out except that 10.0 kg of L-lactic acid were replaced by 50 parts of L-lactic acid and 50 parts of D-lactic acid to obtain pellets of polylactic acid. Results are illustrated in Table 2.

Preparation Example 4

The same procedures as described in Preparation Example 1 were carried out except that 10.0 kg of L-lactic acid were replaced by 50 parts of L-lactic acid and 50 parts of glycolic acid to obtain pellets of copolymers of L-lactic acid and hydroxycarboxylic acid. Results are illustrated in Table 2.

Containers illustrated in the following examples were prepared from the polymers obtained in Preparation Examples 1–4.

Example 1–3

The L-lactic acid polymer obtained in Preparation Example 1 and the DL-lactic acid polymer obtained in Preparation Example 2 were blended in proportions illustrated in Table 1 and preforms (bottomed parisons) were prepared with an injection molding machine at an injection temperature of 190°–220° C. and mold temperature of 35° C. Tg's of the thermoplastic polymer composition of preforms thus obtained were 54° C. in Ex 1, 53° C. in Ex 2 and 53° C. in Ex 3, respectively.

Injection drawn blow molding was carried out by using these preforms to obtain containers having an internal volume of 500 ml and weight of 30 g. Blow molding was conducted at 80° C. with a longitudinal draw ratio of twofold and transverse draw ratio of twofold.

The drawn blow molding temperature 80° C. was in the range of Tg and Tg+60° C., respectively.

Example 4

76 parts of the L-lactic acid polymer obtained in Preparation Example 1, 19 parts of the DL-lactic acid polymer obtained in Preparation Example 2 and 5 parts of glycerine triacetate as a plasticizer were blended and preforms (bottomed parisons) were prepared with an injection molding machine at an injection temperature of 180°–210° C. and mold temperature of 25° C. Tg of the thermoplastic polymer composition of the preforms thus obtained was 30° C.

Injection drawn blow molding was carried out by using the preforms to obtain containers having an internal volume of 500 ml and weight of 30 g. The same procedures as described in Example 1 were carried out except that blow molding was conducted at 70° C. The drawn blow molding temperature 70° C. was in the range of Tg and Tg+60° C.

Comparative Example 1

Injection drawn blow molding was conducted by using the preform obtained in Example 1. The same procedures as described in Example 1 were carried out to obtain a container except that drawing was conducted at 130° C. which is a temperature exceeding Tg+60° C.

Comparative Example 2

Injection drawn blow molding of the preform obtained in Example 1 was carried out to obtain a container by the same procedures as described in Example 1 except that the draw ratio was changed to twofold in the longitudinal direction and 7 times in the transverse direction.

Comparative Example 3–4

The lactic acid base polymer used in Example 1 was directly molded into a container without preforming. Results of direct blow molding and direct injection molding are illustrated in Comparative Example 3 and Comparative Example 4 respectively.

Comparative Example 5

A container was obtained by carrying out the same procedures as described in Example 1 except that the lactic acid based polymer was replaced by a copolymer of hydroxybutyrate and hydroxyvalerate.

Comparative Example 6

A container was obtained by carrying out the same procedures as described in Example 1 except that the lactic acid based polymer was replaced by polypropylene.

Physical properties were evaluated by the following methods on the containers obtained in Example 1–5 and Comparative Example 1–6. Results are illustrated in Table 1.

① Light transmittance:
In accordance with ASTM D-1746.
② Drop impact test:
To a container having an internal volume of 500 ml and an weight of 30 g, 400 ml of water was packed and repeatedly dropped onto a concrete floor-from a height of 1.2 m at an environmental temperature of 20° C. Numbers of dropping were counted until the container was broken. Dropping was repeated 10 times and no breakage is indicated by ⊙.
③ Degradation test in soil:
A degradation test was conducted by burying the containers in soil at 35° C. under a moisture content of 30% for 2 months.

Degradability was evaluated by change of appearance by an external force and a rate of weight loss.

As seen in Table 1, the containers obtained in the invention had excellent light transmittance and falling impact strength and also good degradability in soil.

of the container were measured and the results are illustrated in Table 2.

These examples are not intended to limit the scope of the present invention. This may be practiced or embodied in still other ways without departing from the spirit or essential character thereof.

TABLE 1

| | polymer component | | processing condition | | | | physical property of container | | | |
|---|---|---|---|---|---|---|---|---|---|---|
| | L-lactic acid | DL-lactic acid | pre*1 or direct | drawing temperature | drawing ratio*2 | process-ability | light transparency | drop impact test | degradation in soil | |
| No. | (wt %) | (wt %) | | (°C.) | | | (%) | | appearance | weight loss (%) |
| Ex 1 | 80 | 20 | pre | 80 | 2 × 2 | good | 91 | ⊙ no breakage | destructed easily by force | 13 |
| Ex 2 | 50 | 50 | pre | 80 | 2 × 2 | good | 91 | ⊙ no breakage | destructed easily by force | 14 |
| Ex 3 | 20 | 80 | pre | 80 | 2 × 2 | good | 90 | ⊙ no breakage | destructed easily by force | 17 |
| Ex 4 | 76*3 | 19*3 | pre | 70 | 2 × 2 | good | 91 | ⊙ no breakage | destructed easily by force | 17 |
| Comp. Ex 1 | 80 | 20 | pre | 130 | 2 × 2 | good | 75 | = no breakage | destructed easily by force | — |
| Comp. Ex 2 | 80 | 20 | pre | 80 | 2 × 7 | deviated thickness | 90 | broken by 3 times | destructed easily by force | — |
| Comp. Ex 3 | 80 | 20 | direct | — | — | poor | — | — | — | — |
| Comp. Ex 4 | 80 | 20 | direct | — | — | good | 90 | broken by 2 times | destructed easily by force | — |
| Comp. Ex 5 | copolymer of hydroxy butyrate and hydroxy valerate | | pre | 80 | 2 × 2 | good | 70 | ⊙ no breakage | destructed easily by force | 20 |
| Comp. Ex 6 | polypropylene | | pre | 80 | 2 × 2 | good | 85 | ⊙ no breakage | unchanged | 0 |

TABLE 2

| | polymer component | | property of polymer | | physical property of container | | |
|---|---|---|---|---|---|---|---|
| | L-lactic acid | Lactic acid | average molecular | Tg | light transparency | degradation in soil | |
| No. | (wt %) | (wt %) | weight | (°C.) | (%) | appearance | weight loss (%) |
| Ex 5 | 50 | 50 | 100,000 | 46 | 90 | destructed easily by force | 15 |

| | polymer component | | property of polymer | | physical property of container | | |
|---|---|---|---|---|---|---|---|
| | L-lactic acid | hydroxy-carboxylic acid | average molecular | Tg | light transparency | degradation in soil | |
| No. | (wt %) | (wt %) | weight | (°C.) | (%) | appearance | weight loss (%) |
| Ex 6 | 50 | glycolic acid 50 | 100,000 | 42 | 91 | destructed easily by force | 19 |

Example 5

A container was obtained by carrying out the same procedures as described in Example 1 except that the polylactic acid of L-lactic acid and D-lactic acid obtained in Preparation Examples 3 was used. Physical properties of the container were measured and the results are illustrated in Table 2.

Example 6

A container was obtained by carrying out the same procedures as described in Example 1 except that the copolymer of L-lactic acid and glycolic acid obtained in Preparation Examples 4 was used. Physical properties

What is claimed is:

1. The impact resistant, biodegradable container having a light transmittance of 85% or more obtained by the process for molding a container of a shape from a thermoplastic polymer composition having a polymer of lactic acid or a copolymer of lactic acid and hydroxycarboxylic acids other than lactic acid as a main component having a molecular weight of 10,000 or more, the process comprising:

(1) preforming the thermoplastic polymer composition into a preform in a temperature range of 180°–300° C., and thereafter (2) drawn blow molding the preform into a container in a temperature range of 20° to 125° C. which corresponds to the range of from Tg to Tg+60° C. on the basis of the glass transition temperature Tg of the thermoplastic polymer composition and at a draw ratio of 1.2 to 6 times, wherein the glass transition temperature Tg is in the range of 20° to 65° C.

2. The container of claim 1 wherein the lactic lactic is a dimer of said lactic acid.

3. The container of claim 1 wherein the lactic acid is L-lactic acid, D-lactic acid or a mixture thereof.

4. The container of claim 1 wherein the hydroxycarboxylic acids is glycolic acid.

5. The container of claim 1 wherein said draw ratio is from 2 to 4 times.

6. The container of claim 1 wherein preforming is injection molding, the preform is a bottomed parison and the drawn blow molding is injection drawn blow molding.

7. The container of claim 1 wherein preforming is extrusion molding, the preform is a parison and the drawn blow molding is extrusion drawn blow molding.

8. The container of claim 1 wherein the container has a light transparency of at least 90%.

* * * * *

UNITED STATES PATENT AND TRADEMARK OFFICE
CERTIFICATE OF CORRECTION

PATENT NO. : 5,409,751
DATED : April 25, 1995
INVENTOR(S) : Kazuhiko Suzuki, et al It is certified that error appears in the above-indentified patent and that said Letters Patent is hereby corrected as shown below:

Column 9,

In Claim 2, line 1, please delete "lactic lactic" and insert therefor -- lactic acid --.

Signed and Sealed this

Twenty-seventh Day of February, 1996

Attest:

BRUCE LEHMAN

Attesting Officer

Commissioner of Patents and Trademarks